Dec. 23, 1958  H. W. BELLAS ET AL  2,865,829
SLUG EJECTOR
Filed April 12, 1945  4 Sheets-Sheet 1
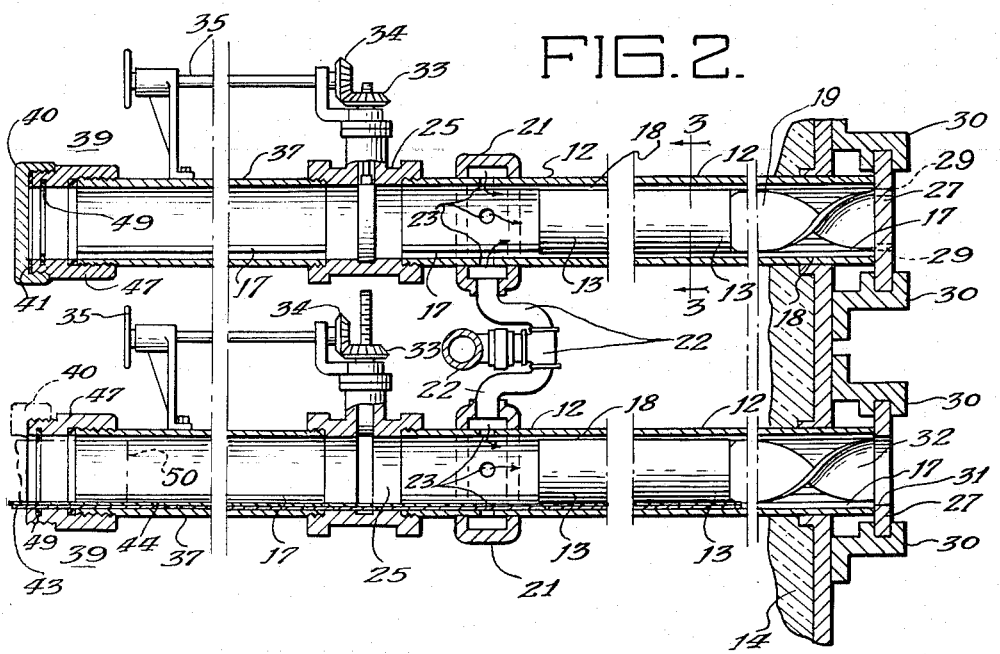
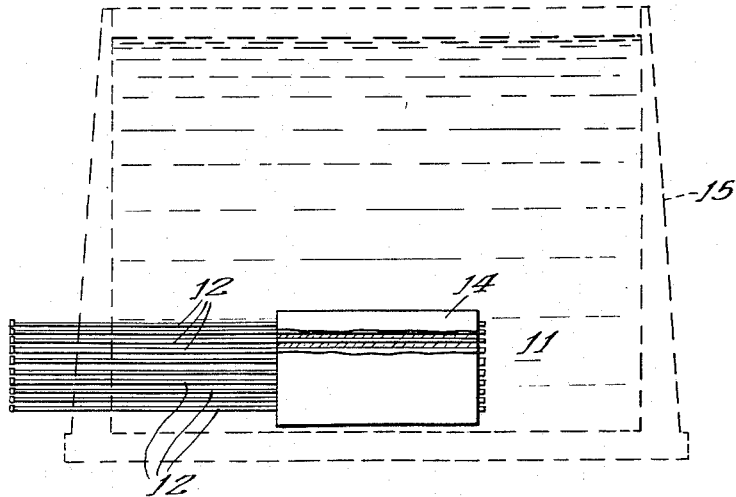

Dec. 23, 1958  H. W. BELLAS ET AL  2,865,829
SLUG EJECTOR
Filed April 12, 1945  4 Sheets-Sheet 2

Witnesses:
Herbert E. Metcalf
Paul A. Glaister

Inventors:
Hugh W. Bellas
Richard V. Lyon
By Robert A. Lavender
Attorney

Dec. 23, 1958  H. W. BELLAS ET AL  2,865,829
SLUG EJECTOR

Filed April 12, 1945  4 Sheets-Sheet 3

Witnesses:
Herbert E. Metcalf
Paul J. Glauster

Inventors.
Hugh W. Bellas
Richard N. Lyon
By:
Robert K. Lavender
Attorney

Dec. 23, 1958  H. W. BELLAS ET AL  2,865,829
SLUG EJECTOR
Filed April 12, 1945  4 Sheets-Sheet 4
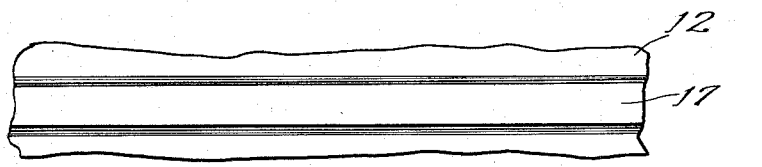
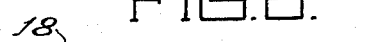
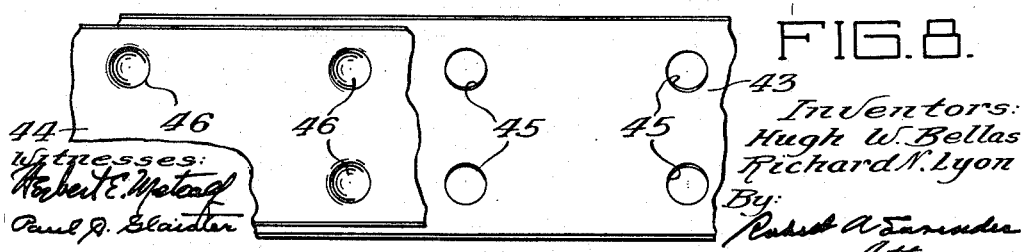

2,865,829

SLUG EJECTOR

Hugh W. Bellas, Richland, Wash., and Richard N. Lyon, Oak Ridge, Tenn., assignors to the United States of America as represented by the United States Atomic Energy Commission Application April 12, 1945, Serial No. 588,057

13 Claims. (Cl. 204—193.2)

The present invention relates to slow neutron, chain reacting systems, commonly referred to as neutronic reactors, and it has particular relation to apparatus of this character utilizing bodies of fissionable material arranged geometrically in lattice structures within a suitable moderator, such as carbon, heavy water, or beryllium.

In certain existing designs of apparatus of this type, a fissionable composition such as uranium metal containing a known percentage of fissionable material is utilized as the reactive material, the uranium metal containing the fissionable material being formed into cylindrical slugs, which preferably include a protective jacket or coating of aluminum, or other suitable material having low neutron absorption characteristics. The quantity of such materials included within the reactor should be limited to likewise limit the neutron absorption. The slugs are contained within thin walled aluminum tubes having a somewhat greater cross sectional area than the slug bodies, thereby providing an annular passageway through which a cooling medium such as water can be circulated to remove the reaction-produced heat.

The present invention is an improvement on the structure disclosed in the copending application of Miles C. Leverett and John P. Howe, Serial No. 580,783, which was filed on March 3, 1945.

When the neutronic reactor has attained a given phase of operation it is necessary to replace the slugs of fissionable material as described in the copending application of Wigner et al., Serial No. 568,900, filed December 19, 1944, now Patent No. 2,708,656, dated May 17, 1955.

Because of the radioactive nature of the end products of the chain reaction the most practical method of removing the reactive material slugs at the conclusion of any particular reacting period is to push them through the reactor and out of the containing tubes, by the use of a suitable pusher or by adding new slugs at the charging end, the new slugs forcing out corresponding numbers of reacted slugs at the discharge end of the reactor. Due to the rather considerable weight of the slugs and because of the fact that the contacting surfaces of both the slugs and the tubes, which generally are of aluminum, tend to corrode and adhere, substantial friction is developed between the slug bodies and the supporting ribs or tracks during the slug removal operation. This wears and sometimes scores the ribs, often necessitating replacement of the tubes, and in addition it may damage the relatively thin protective jacket of the slugs, which is very undesirable. Also, some difficulty has been experienced in getting the slugs in motion. Apparently there is oxide formation, or the like, between the slug bodies and the supporting ribs of the tubes which produces adherence. As a result of these difficulties, a need has arisen for some means for minimizing friction and otherwise facilitating the removal of slugs from neutronic reactor structures of the above-described type, and the principal object of our invention is the provision of such means.

As will hereinafter appear, the problem is further complicated by the fact that a cooling medium must be circulated through the annular space provided between the slugs and the tubes not only during the operation of the reactor but also during the slug removal operation to remove the heat developed by the reaction and by the radioactive decay of the reaction products. A further object of our invention, therefore, is to provide slug removal means in accordance with the above stated principal object which will not interfere with the normal circulation of the cooling medium during use.

These and other objects of our invention and the details of one preferred embodiment thereof will be made more apparent by reference to the following description and drawings.

In the drawings,

Fig. 1 is a diagrammatic view, partially in section, showing certain of the features of a neutronic reactor of the type to which the present invention relates;

Figure 2A:
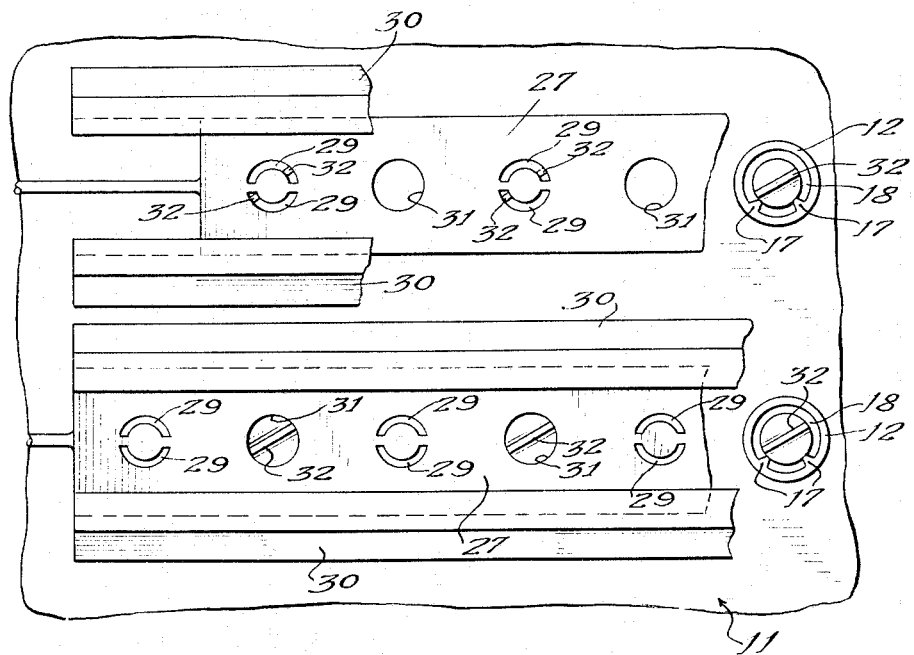
Fig. 2 is a fragmentary vertical sectional view showing certain of the features of the slug containing tubes of the reactor of Fig. 1 in greater detail.
Figure 2B:
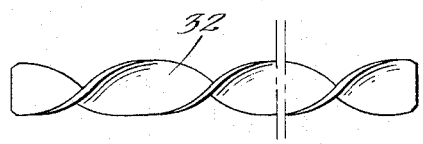
Figure 3:
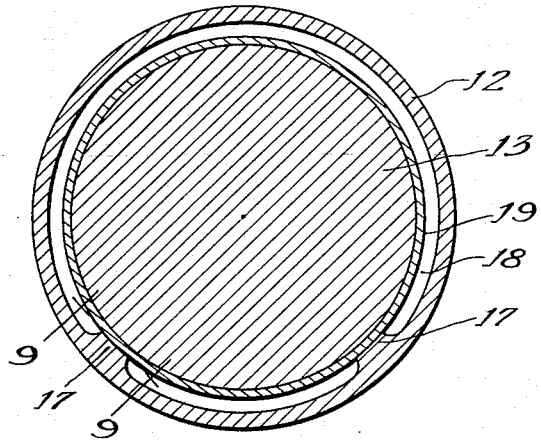
Figure 4:
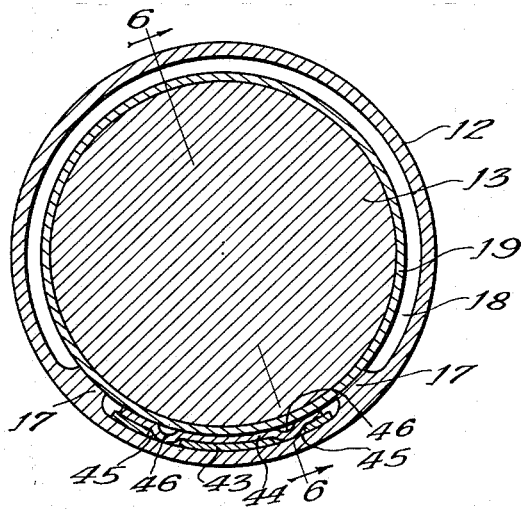
Figure 5:
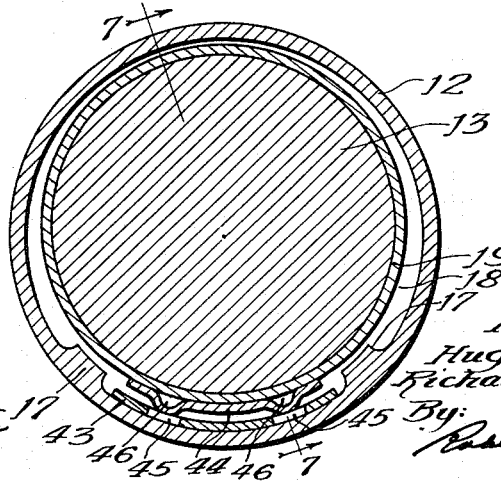

Fig. 2-A is a fragmentary end elevation of the slug-containing tubes and associated structure shown in elevation in Fig. 2;

Fig. 2-B is an elevational view of one of the dummy slugs contained in the tubes of the Fig. 2 structure;

Fig. 3 is a transverse, cross-sectional view through one of the slug-containing tubes of Fig. 2 taken along the line 3—3 thereof;

Figs. 4 and 5 are sectional views, similar to Fig. 3, illustrating the operation of the slug-removal apparatus of the present invention;

Fig. 6 is a longitudinal cross-sectional view on the line 6—6 of Fig. 4;

Fig. 7 is a longitudinal sectional view on the line 7—7 of Fig. 5 and illustrates the slug-removal apparatus of the present invention in the operating position;

Fig. 8 is a fragmentary plan view of the slug-removal apparatus of the present invention; and Fig. 9 is a fragmentary view on the line 9—9 of Fig. 3 illustrating one of the slug-supporting ribs forming a part of the slug-containing tubes.

The neutronic reactor illustrated very generally at 11 in Fig. 1 includes a plurality of horizontal tubes 12 through which slugs 13 of uranium or other reacting materials are introduced into the reacting zone of the reactor. The tubes 12 extend through a suitably shaped body 14 of neutron moderating material such as carbon, $D_2O$, or beryllium which serves the purpose of slowing the fast neutrons liberated during fission. The moderating material may conveniently comprise blocks of graphitic carbon assembled in a cubical structure, as illustrated at 14, and the reacting section of such a reactor will normally comprise a generally spherical or cylindrical central portion of this cube. The reactor system includes a neutron reflecting shield, not shown, and the active portions of the system may conveniently be located within a water filled concrete structure, outlined generally at 15, which acts as a neutron absorbing shield.

The other figures of the drawing include a somewhat more detailed showing of the structure of the individual slug containing tubes 12 and of the circulating system provided for the water or other cooling medium. The slug containing tubes 12 are arranged in parallel rows, as shown particularly in Figs. 2 and 2-A. Each of the tubes 12 extends the full length of the reactor 11 and is constructed of thin walled tubing, preferably aluminum or other material having low neutron absorbing characteristics. Each of the tubes 12 is provided with two radially positioned ribs 17 adapted to engage the slugs 13 of uranium, or other reacting material, and to support those slugs concentrically within the tube.

In one typical reactor the aluminum tubes may have an internal diameter of about 1.60 inches, a total length of about 44 feet, and a wall thickness of about .130 inch. The ribs 17 may be located at the bottom of the tube at approximately 90° spacing and have a height of 0.80 inch. The slugs 13 used in connection with this reactor may have an outside diameter of 1.44 inches, a length of 8 inches, and contain about 8 pounds of uranium. With these relative dimensions, the annular space 18 between the inner wall of the tubes 12 and the slugs 13 may have a uniform thickness of approximately .080 inch. Each of the slugs 13 includes a thin, can-like, outer covering or container 19 of aluminum which completely encloses the inner body of uranium metal, thereby protecting the uranium from corrosion and protecting the cooling medium from contamination with radioactive fission products.

In this structure water is used as a cooling medium, and the water is introduced into each of the tubes 12 by means of a ring header 21, illustrated particularly in Fig. 2. The ring headers 21 are interconnected by suitable manifolds and piping 22, and the cooling water is admitted to the tubes 12 adjacent the charging end thereof through openings 23 in the tube walls.

The charging end of each of the slug containing tubes 12 is normally closed by a valve 25, as illustrated, and the discharge ends of the tubes 12 in each of the rows of tubes are adapted to be closed by a slide member 27 having spaced vent openings 29 and slug removal openings 31 provided therein. The vent openings 29 align with the ends of the tubes 12 during normal operation of the reactor and vent the cooling water which is forced through the annular passageways 18 provided between the slugs 13 and the inner walls of the containing tubes 12 to the structure 15. When the reactor is operating at reasonably high capacities, there is considerable endwise pressure tending to force the slugs 13 toward the discharge ends of the tubes 12. This pressure might move the end slugs into contact with the vent openings 31, thereby restricting the water flow through the annular passageways 18, which is undesirable, and to obviate this possibility a dummy slug 32 having the form of a twisted ribbon is placed at the discharge end of each tube 12. The dummy slugs 32 are held in place by the slide members 27 and assure free flow of the cooling water through the vent openings 29. The slide members 27 are supported in suitable guides 30 which are attached to the end wall of the reactor 11. The slug removal openings 31 are circular in outline and have the same cross-sectional area and spacing as the discharge openings in the tubes 12. The slide members 27 may be operated by suitable apparatus, not shown, to move the slug exit openings 31 therein into coincidence with the discharge ends of the tubes 12 whereby the dummy slugs 32 and the active slugs 13 may be ejected from the tubes.

Since, as has been previously stated, the cooling liquid must be continuously circulated during the slug removal operation, a lock is provided at the inlet or charging end of each of the slug containing tubes 12. This lock includes the valve 25, which may conveniently be operated through a pair of cooperating bevel gears 33 and 34 and an operating handle 35, a section of cylindrical tubing 37, preferably of the same size as the slug containing tubes 12 and having ribs 17 similar to the ribs 17 in the tubes 12, and a combination cap and gland structure 39 through which new, unreacted slugs 13 and the slug ejection apparatus of the invention may be introduced into the lock and the associated tube 12 without loss of cooling fluid. When the lock is not in use, the inlet end thereof is closed by a cap element 40 and a sealing washer 41, as illustrated in Fig. 2.

The slug extractor apparatus used for facilitating the removal of the slug members 13 and for providing a surface on which those members can be moved out of the tubes 12 without wearing or scoring of the slug jackets or the tubes, comprises a pair of elongated ribbon-like members 43 and 44, which are arcuate in cross section and which include means operable to effect transverse separation of those members as an incident to relative longitudinal movement thereof. The arcuate width of the extractor members 43 and 44 is slightly less than the spacing between the slug supporting ribs 17, and the combined thickness of the two extractor members when in the unseparated position is slightly less than the radial height of those ribs, and hence less than the radial width of the annular passageway 18. This arrangement permits the extractor to be readily inserted into any one of the slug containing tubes 12, beneath the slugs 13, and pushed through the tube to the discharge end thereof. When so placed the extractor members 43 and 44 may be moved longitudinally relative to each other, thereby effecting sufficient separation of those members to lift the slugs 13 off the supporting ribs 17. During this operation, the two ribbon-like elements 43 and 44 of the extractor are restrained from sidewise movement by the slug supporting ribs 17, and buckling is prevented by the weight of the slugs 13 pressing the extractor elements into contact with each other and with the adjacent underlying surface of the tubes 12. The slug lifting operation, as will appear hereinafter, is accomplished by a wedging or cam action, and hence requires the application of only a relatively small longitudinal force. For best results over a period of time, it appears desirable that the extractor members 43 and 44 should be fairly stiff longitudinally, and particularly good results have been obtained with extractor members made of spring metals, for example stainless steel, stressed into arcuate shape.

The means utilized to effect the desired transverse separation of the two ribbon-like elements 43 and 44 of the slug extractor means, comprises cooperating, regularly spaced, openings 45 and protuberances 46 which interfit when the extractor elements are in the non-separated position shown in Figures 4 and 6. This arrangement minimizes the thickness of the extractor, facilitating its insertion into the annular space 18 between the slugs 13 and the tube wall, and at the same time it provides positive means operable upon relative longitudinal movement of the two extractor members 43 and 44 to effect transverse separation of those two elements, as illustrated particularly in Figs. 5 and 7, this action being utilized to effect lifting of the slugs 13 from the supporting ribs 17.

In the structure shown in the drawings, the cooperating openings 45 and protuberances 46 are respectively circular and hemispherical in outline and are symmetrically spaced. It will be undersood that cooperating, interfitting parts of various other shapes and arrangements may be employed to advantage and are within the teachings of the invention. Also, it is not essential that all of the protuberances be formed in one of the ribbon-like elements; the sole requirement is that the cooperating means shall interfit to reduce the thickness of the extractor during insertion and will exert a wedging or camming expansion action in response to relative longitudinal movement of the extractor elements. To minimize friction, it is desirable that the engaging edges of the protuberances and holes be rounded off.

Since the curvature of the extractor members 43 and 44 substantially conforms to the curvature of the annular passageway 18 provided between the slugs 13 and the walls of the tubes, and since the sepration of the extractor members exceeds the width of the annular passageway 18, it will be apparent that the slugs will rest on the underlying curved surface of the upper extractor member 44 when the extractor has been operated. The upper extractor member 44 thus provides a slideway on which the slugs may be moved into and out of the slug containing tubes 12 without contacting the supporting ribs and without substantial wearing of the slug jackets 19 due to the large area of contact. Injury to the slug protective jackets 19, the ribs 17, and the tubes 12 is thus minimized during the charging and emptying of the reactor, and much more satisfactory operation over a period of time results.

In order to introduce the extractor into the slug containing tubes 12 without excessive loss of the cooling material, it is desirable to employ a gland or other sealing means at the charging end of the reactor. One suitable structure for this purpose is illustrated at 39 in Fig. 2. This arrangement includes an annular body 47 which is adapted to be screwed onto the inlet end of the outer tubular section 37 of the lock and which is provided with a centrally positioned opening and gland 49 for receiving simultaneously both the extractor and one of the slugs 13, or a similarly shaped sealing member as indicated by the dot and dash lines 50 in Fig. 2. The central opening in the gland 49 is normally closed by the cap 40.

When it is desired to utilize the extractor in order to loosen any slugs 13 which may have become stuck in one of the tubes 12, or to provide a slideway for facilitating movement of the slugs through and out of the tubes, the valve 25 will be operated to close the inner end of the lock. It will be noted that this will not interfere with the circulation of the cooling liquid. The cap 40 can then be removed and the extractor members 43 and 44, which have previously been moved to the engaging position, together with one of the slugs 13, or equivalent sealing member, as indicated at 50, will be introduced into the gland opening 49 and the adjacent tubular section 37 of the lock. The gland 49 is so designed that it provides a substantially liquid type seal when both the extractor and one of the slugs 13 are contained therein. The valve 25 will then be opened and the extractor with both elements still engaged pushed completely through the connecting tube 12 to the discharge end thereof, the sealing slug being left in place in the gland 49. At this point the two extractor members 43 and 44 will be moved longitudinally relative to each other, preferably by pulling one of the two members while holding the other stationary. This operation effects transverse separation of the two members 43 and 44 as a result of the interaction of the protuberances 46 and holes 45, loosens any adhering slugs, and raises all of the slugs 13 out of contact with the supporting ribs 17 so that they rest on the curved upper surface of the upper extractor member 44. The slugs may then be discharged from the tube 12 by simply pushing the requisite number of fresh slugs through the gland and opening 41, the extractor being left in place during the charging operation.

At the conclusion of this operation, the two elements of the extractor may be moved longitudinally relative to each other so as to bring the cooperating protuberances 46 and openings 45 into engagement with each other. The upper extractor member 44 is thereby disengaged from the slugs 13, and since the thickness of the extractor, when the two extractor members are in the engaged position is less than the width of the annular space 18 between the slugs 13 and the wall of the slug containing tube 12, the extractor can be readily withdrawn from the tube. A slug should be left in the gland 41 during the removal of the extractor to prevent discharge of the cooling fluid. The valve 25 will then be operated to close off the tubular section 37 of the lock and the slug 13, or equivalent means, which has been used for sealing purposes, will be removed from the gland 41. The cap 40 should then be replaced whereupon the valve 25 may be opened. The entire operation is thus carried on without substantial loss of cooling fluid. If desired, the rate of flow of coolant may be reduced while the discharging operation is being conducted in order to avoid or minimize leakage.

As a preliminary to any slug discharge operation, it is, of course, necessary that the slide members 27 be operated to bring the circular openings 31 into alignment with the discharge ends of the tube. Prior to the charging operation, the slide members 27 should be moved to align the vent openings 29 with the discharge end of the tubes to prevent the slugs 13 from being pushed completely through the tubes and to assure free flow of the cooling water when operation of the reaction is resumed.

The structure described utilizes water as the cooling medium. It will be understood, however, that other cooling fluids, either liquid or gaseous could be used and such other fluids are within the contemplation of the invention.

In the foregoing we have disclosed the features of a relatively simple device which may be used in conjunction with a neutronic reactor for facilitating the removal of the slugs of reactive material contained in such reactor. The apparatus is operable not only to loosen slugs which may have become stuck in the slug containing tubes extending through the reactor but, in addition, it provides a surface on which the slugs rest and on which they can be readily moved into or out of the tubes without wearing the slug supporting ribs or the slug jackets. The apparatus is capable of use without substantial interference with the normal flow of cooling medium through the reactor, and at the same time it is positive and simple to operate. The features of the invention which are believed to be novel are particularly pointed out in the claims.

What is claimed is:

1. A combination slug extractor and slideway for use in connection with a neutronic reactor comprising a pair of elongated, ribbon-like members in face-to-face abutment having an arcuate cross section, said members being longitudinally stiff and being provided with cooperating projections and openings extending normal to the interface of said members so arranged that relative longitudinal movement of said members will effect transverse separation of said members.

2. A combination slug extractor and slideway for use in connection with a neutronic reactor comprising a pair of elongated, longitudinally stiff ribbon-like members in face-to-face abutment having an arcuate cross section, one of said members being provided with symmetrically spaced openings and the other of said members being provided with similarly spaced projections which normally extend into said openings, said openings and said projections extending normal to the interface of said members and being so shaped and so proportioned that relative longitudinal movement of said members will cause said members to move apart.

3. In combination with a neutronic reactor including a tube in the reactor, the material of said tube having low neutron absorbing characteristics, a slug extractor means including a pair of elongated, ribbon-like members in face-to-face abutment adapted for insertion into said tube, and means including cooperating projections and openings extending normal to the interface of said members operable to effect transverse separation of said members.

4. In combination with a neutronic reactor including a tube in the reactor, the material of said tube having low neutron absorbing characteristics, a slug extractor means including a pair of elongated, ribbon-like members in face-to-face abutment adapted for insertion into said tube, said members including cooperating projections and openings extending normal to the interface of said members which are operable to effect transverse separation of said members as an incident to relative longitudinal movement thereof.

5. In combination with a neutronic reactor including a tube in the reactor, the material of said tube having low neutron absorbing characteristics, a combination slug extractor and slideway means, said means including a pair of elongated, ribbon-like members in face-to-face abutment adapted for insertion into said tube and having cooperating projections and openings extending normal to the interface of said members which are operable to effect transverse separation of said members in response to relative longitudinal movement of said members.

6. In combination with a neutronic reactor including a cylindrical tube in the reactor, the material of said tube having low neutron absorbing characteristics, a combination slug extractor and slideway means, said means including a pair of elongated, ribbon-like members in face-to-face abutment which are arcuate in cross section and which are adapted for insertion into said tube, said members having cooperating projections and openings extending normal to the interface of said members which are operable to effect transverse separation of said members in response to relative longitudinal movement of said members.

7. In combination with a neutronic reactor including a cylindrical tube in the reactor, the material of said tube having low neutron absorbing characteristics, a combination slug extractor and slideway means, said means including a pair of elongated, ribbon-like members of spring metal in face-to-face abutment which are permanently stressed into arcuate form, said members being adapted for insertion into said tube and having cooperating projections and openings extending normal to the interface of said members which are operable to effect transverse separation of said members in response to relative longitudinal movement of said members.

8. In combination with a neutronic reactor including a horizontal, cylindrical tube in the reactor, the material of said tube having low neutron absorbing characteristics, an extractor means comprising a pair of elongated members in face-to-face abutment for facilitating the removal of said slug from said tube, said extractor members being arcuate in cross section and including cooperating protuberances and openings extending normal to the interface of said members which effect transverse separation of said members as an incident to relative longitudinal movement thereof, the amount of transverse separation of said extractor members being greater than the effective height of said supporting ribs.

9. In combination with a neutronic reactor including a horizontal, cylindrical tube in the reactor, the material of said tube having low neutron absorbing characteristics, an elongated combination extractor and slideway, said extractor comprising a pair of ribbon-like members in face-to-face abutment which are arcuate in cross section and which are adapted for insertion into said tube, said members being of such width that they will pass freely between said parallel supporting ribs and being provided with cooperating interengaging protuberances and holes extending normal to the interface of said members so designed that said members will be separated as an incident to relative longitudinal movement thereof.

10. In combination with a neutronic reactor including a tube in the reactor, the material of said tube having low neutron absorbing characteristics, and means for circulating a cooling medium in said tube, a slug extractor means including a pair of elongated, ribbon-like members in face-to-face abutment adapted for insertion into said tube, means including cooperating projections and openings extending normal to the interface of said members operable to effect transverse separation of said members, and means whereby said members may be inserted into said tube and said separation producing means may be operated without interrupting the flow of said cooling medium.

11. In combination with a neutronic reactor including a horizontal tube in the reactor, the material of said tube having low neutron absorbing characteristics, and means for circulating a cooling material in said tube, a slug extractor means including a pair of elongated, ribbon-like members in face-to-face abutment adapted for inertion into said tube, said members including cooperating projections and openings extending normal to the interface of said members operable in response to relative longitudinal movement of said members to effect transverse separation thereof, and means whereby said extractor means may be inserted into said tube and may be moved to operate said separating means without interrupting the flow of cooling material.

12. In combination with a neutronic reactor including a horizontally disposed, cylindrical tube in the reactor, the material of said tube having low neutron absorbing characteristics, and means for circulating a cooling liquid through said tube, a combination slug extractor and slideway means, said means including a pair of elongated, longitudinally stiff, ribbon-like members in face-to-face abutment which are arcuate in cross-section and which are adapted for insertion into said tube, said members having cooperating projections and openings extending normal to the interface of said members which are operable in response to relative longitudinal movement of said members to effect sufficient transverse separation of said members, and means including a gland through which said extractor means may be introduced into one end of said tube without interrupting the flow of cooling liquid therethrough.

13. In combination with a neutronic reactor including a horizontally disposed, cylindrical tube of aluminum, and means for forcing a cooling liquid through said tube, a combination slug extractor and slideway comprising a pair of elongated, longitudinally stiff, ribbon-like members in face-to-face abutment having an arcuate cross section and adapted for insertion into said tube, said members being provided with cooperating projections and openings extending normal to the interface of said members so arranged that relative longitudinal movement of said members will effect sufficient transverse separation of said members, and means including a gland through which said extractor members may be introduced into said tube and operated to effect transverse separation thereof without interrupting the flow of cooling liquid.

References Cited in the file of this patent

UNITED STATES PATENTS

| 1,333,701 | Bloom | Mar. 16, 1920 |
| 1,663,370 | Edwards | Mar. 20, 1928 |
| 2,019,102 | Taylor | Oct. 29, 1935 |
| 2,228,139 | Leonhardy | Jan. 7, 1941 |

FOREIGN PATENTS

| 114,150 | Australia | May 21, 1940 |
| 861,390 | France | Feb. 7, 1941 |
| 233,011 | Switzerland | Oct. 4, 1944 |

OTHER REFERENCES

Smyth: Atomic Energy for Military Purposes, pp. 103, 104, August 1945. (Copy from Supt. of Doc., Washington 25, D. C.)